Figure 3:
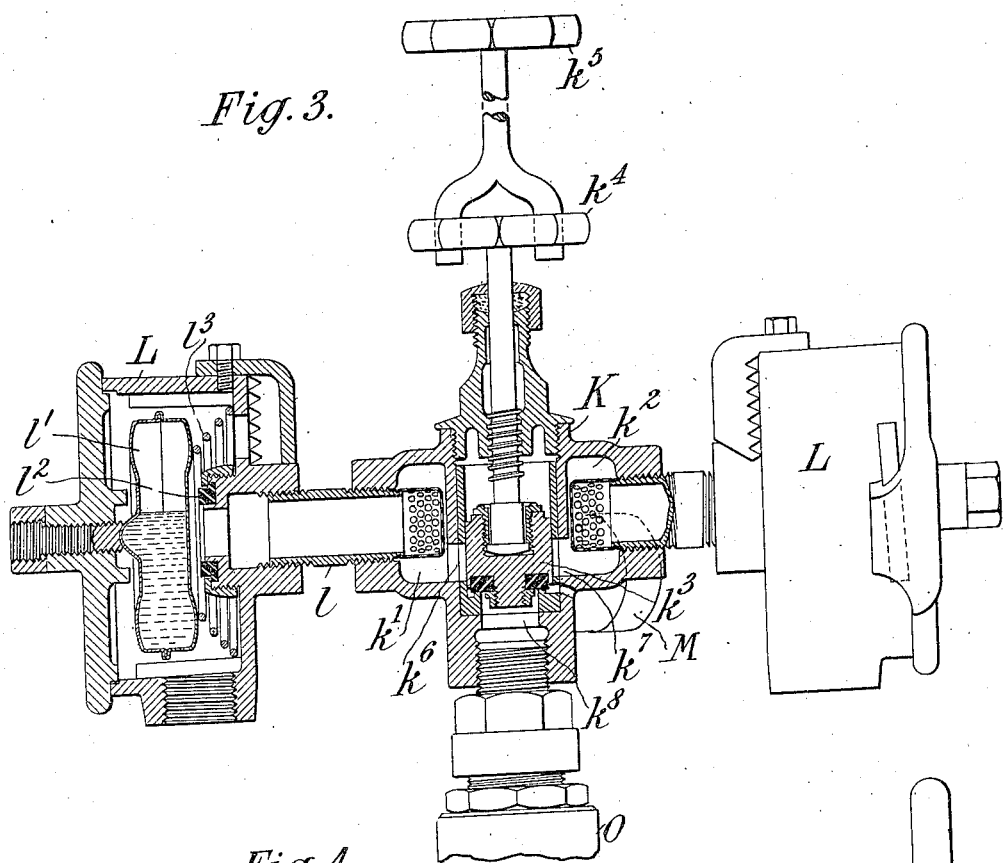

E. E. GOLD.
STEAM HEATING SYSTEM.
APPLICATION FILED NOV. 7, 1911.
1,052,814.
Patented Feb. 11, 1913.
5 SHEETS—SHEET 1.
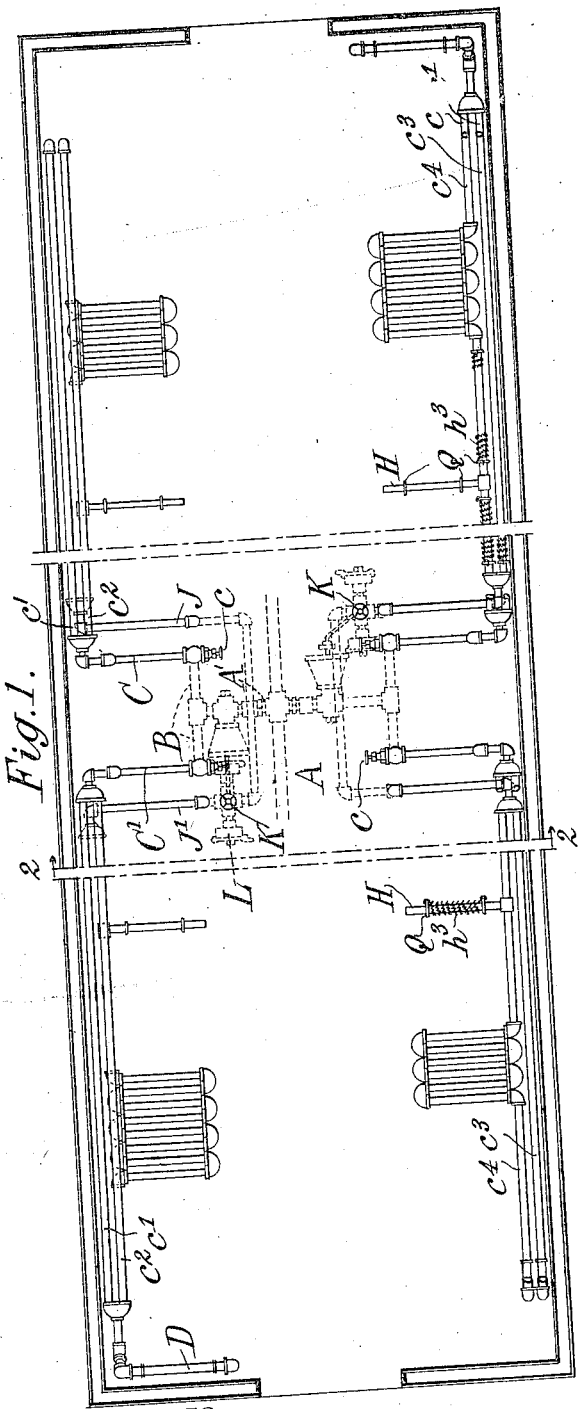
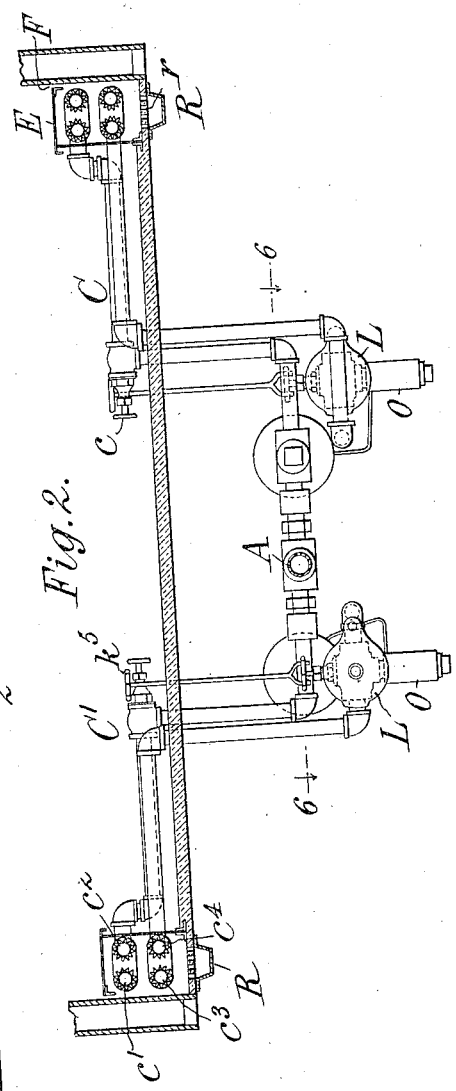
WITNESSES:
Rene Bruine
Fred White
INVENTOR
Edward E. Gold.
By Attorneys,
Fraser, Furth & Myers

E. E. GOLD.
STEAM HEATING SYSTEM.
APPLICATION FILED NOV. 7, 1911.

1,052,814.

Patented Feb. 11, 1913.

5 SHEETS—SHEET 2.

WITNESSES:

INVENTOR
Edward E. Gold,
By Attorneys,

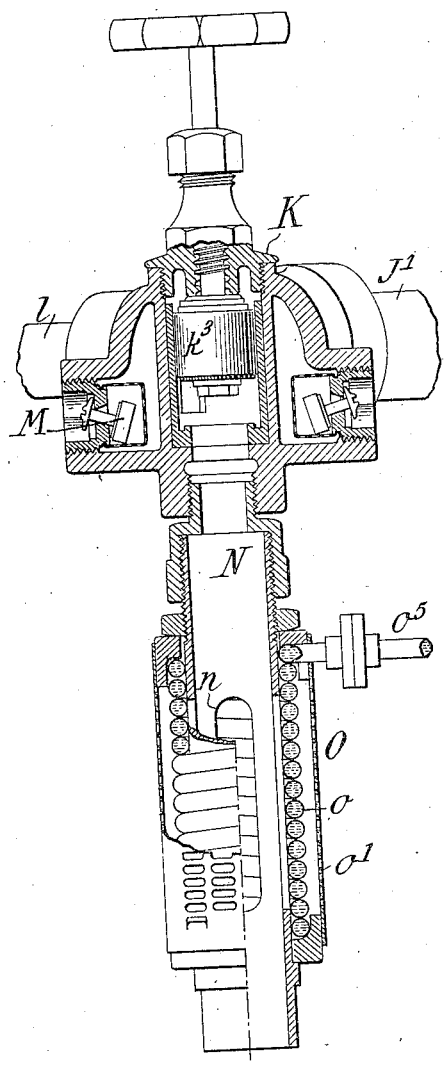
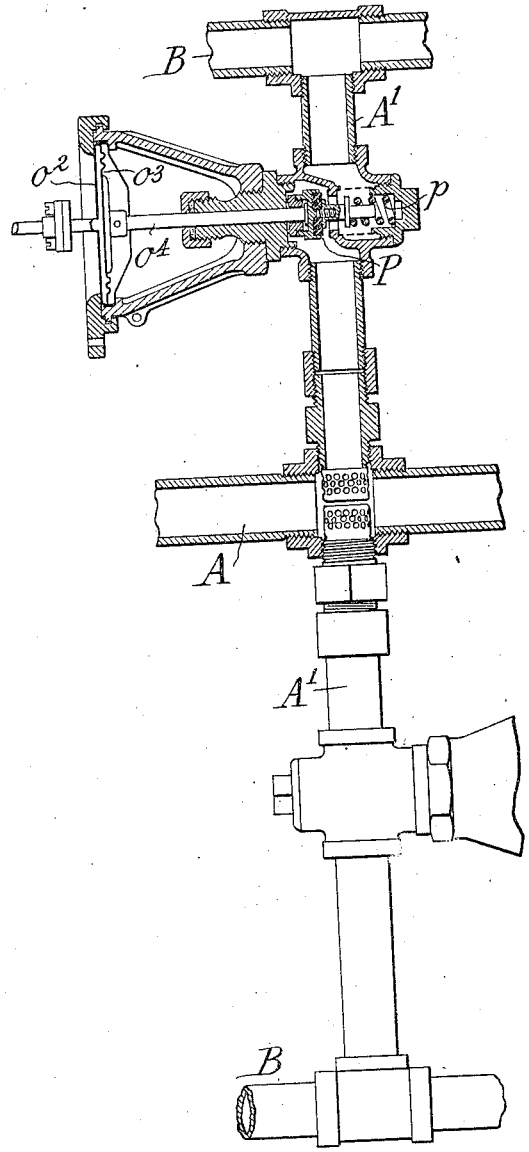

E. E. GOLD.
STEAM HEATING SYSTEM.
APPLICATION FILED NOV. 7, 1911.
1,052,814.
Patented Feb. 11, 1913.
5 SHEETS—SHEET 4.
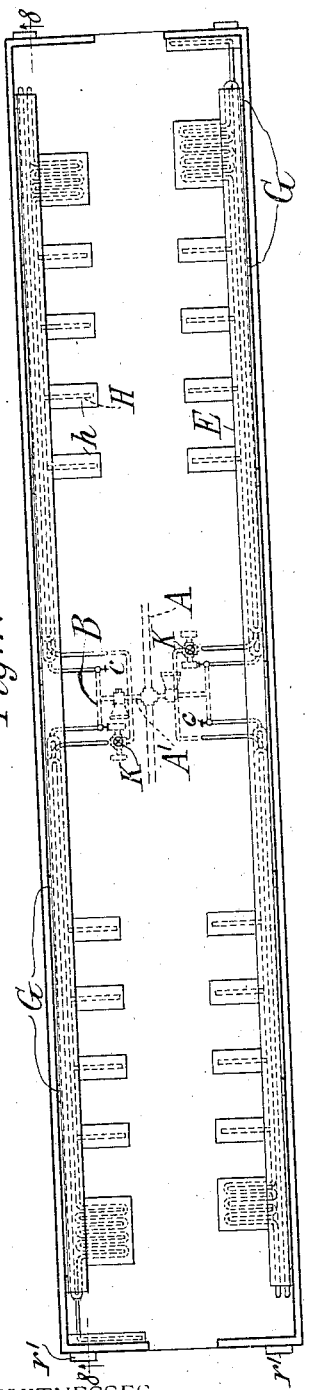
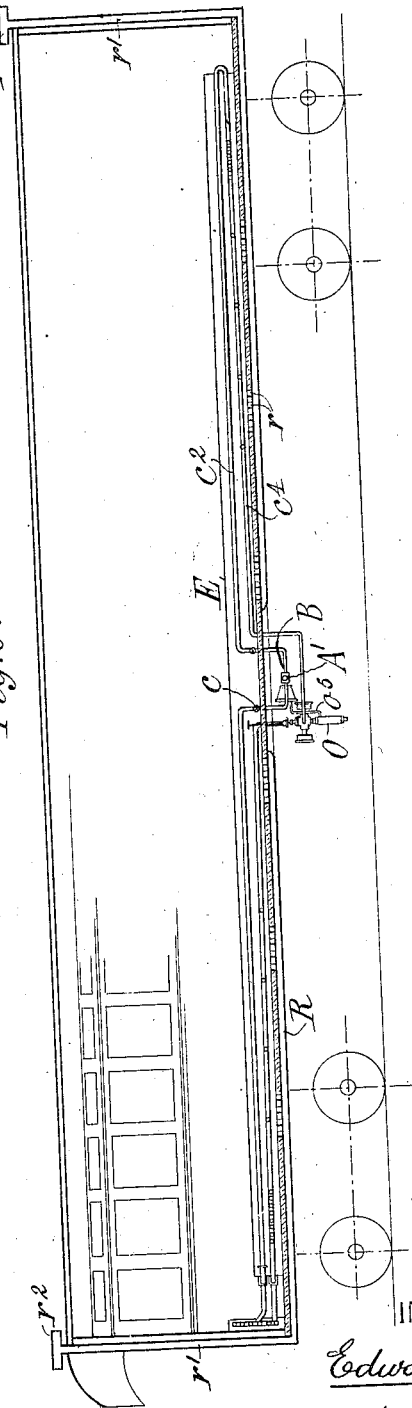
INVENTOR:
Edward E. Gold,
By Attorneys,
Fraser, Turk & Myers
WITNESSES:
René Bruine
Fred White E. E. GOLD.
STEAM HEATING SYSTEM.
APPLICATION FILED NOV. 7, 1911.
1,052,814.
Patented Feb. 11, 1913.
5 SHEETS—SHEET 5.
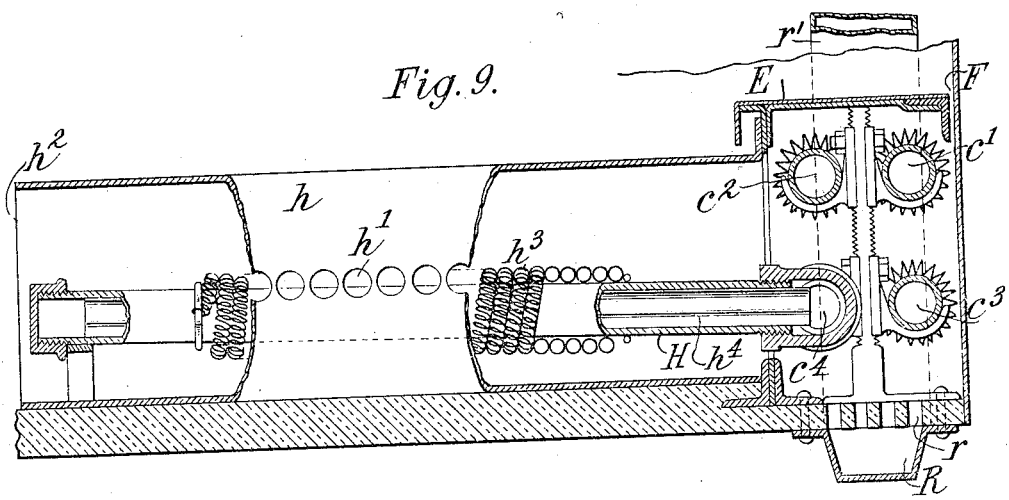
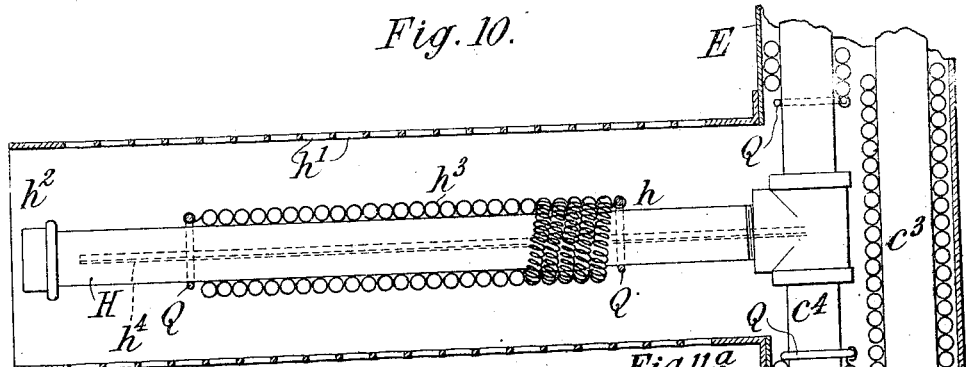
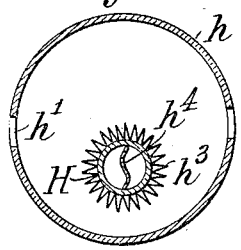
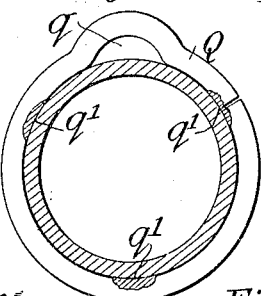
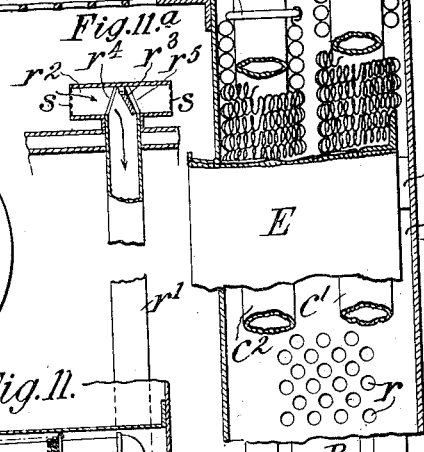
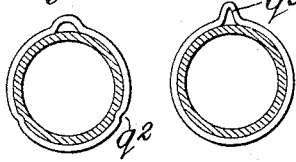
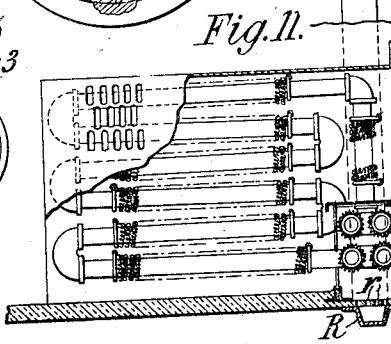
INVENTOR:
Edward E. Gold,
By Attorneys,
Fraser Tuchdanzer
WITNESSES:
Rene Bruine
Fred White

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

STEAM-HEATING SYSTEM.

1,052,814.

Specification of Letters Patent.

Patented Feb. 11, 1913.

Application filed November 7, 1911. Serial No. 658,985.

*To all whom it may concern:*

Be it known that I, EDWARD E. GOLD, a citizen of the United States, residing in the borough of Manhattan, city, county, and State of New York, have invented certain new and useful Improvements in Steam-Heating Systems, of which the following is a specification.

My invention relates to steam heating systems of the kind occasionally referred to as indirect heating systems, and is particularly applicable to heating systems for use in heating the cars of railway trains.

The invention has been particularly designed with reference to the heating of steel railway cars, and is shown in the accompanying drawings in connection with a car of such construction.

An important object of the invention is to reduce the weight of the heating system installed in the car. Such heating system is maintained in the car throughout the entire year, and during a considerable part of the year it is not required for heating the car. But during all of this time it must be transported with the car as dead weight. The weight of such system whether in use or not furnishes a large addition to the weight of the car, and its transportation is a subject of considerable expense to the railway companies.

My invention therefore aims to reduce the weight of such steam heating system, and this I attain by a construction wherein a duplication of parts is avoided, wherein an even distribution of heat throughout the car is accomplished, the loss of heat is less, and consequently the weight of the apparatus of the heating system is much lightened.

The object of my invention is also to provide for heating the sides of the car. This is of great importance in connection with steel cars the sides of which have usually been unpleasantly cold and are apt to cause illness when a part of the body comes in contact with them.

In carrying my invention into effect I provide a plurality of radiating systems in the car, either of which may be disconnected independently of the others, and which combined or singly are adapted to be operated as either pressure or vapor systems and I provide means whereby when such plurality of radiating systems are operated as vapor systems they are subject to a common control. In accordance with my invention a common supply pipe is provided having an inlet valve, and each radiating system has an independent return pipe. Each return pipe is adapted by adjustment to exhaust through its independent trap when operating as a pressure system, or by adjustment when operating as a vapor system all of said return pipes may exhaust through a common outlet, connected with which are thermostatic means controlled by the temperature in the said outlet for automatically operating the valve in the supply pipe.

My invention further contemplates as stated, the provision of means whereby heat is more uniformly distributed within the body of the car, and also whereby the sides of the car may be heated. It has frequently been the practice, when radiating pipes were employed which projected laterally from a main pipe into the body of the car adjacent to the floor, and usually under the car seat, to place the said pipes within a tube or shell which was open at its outer end and next the aisle of the car. This resulted in the heat being supplied principally to the aisle of the car, whence it ascended to the car ventilators which are usually directly overhead, and it was quickly lost. The result of this is that the interior of the car is not uniformly heated. In such systems the longitudinal radiating pipe to which the said branches are connected is usually inclosed in a casing which fitted tightly against the sides of the car, preventing the escape of heated air at such points. This resulted in the sides of the car remaining so cold that they were unpleasant to come in contact with.

My invention, therefore, has for its object to so reconstruct the said shell inclosing the lateral radiating branches as that it shall emit heated air uniformly throughout its length, and also to so reconstruct the air trunk or casing for the longitudinal radiating pipe that a current of heated air shall ascend next to the side of the car, whereby the same may be satisfactorily warmed, and to provide means for supplying atmospheric air to the said air trunk whereby the car is heated and ventilated.

A desirable form in which my invention may be embodied is illustrated in the accompanying drawings.

Figure 4:
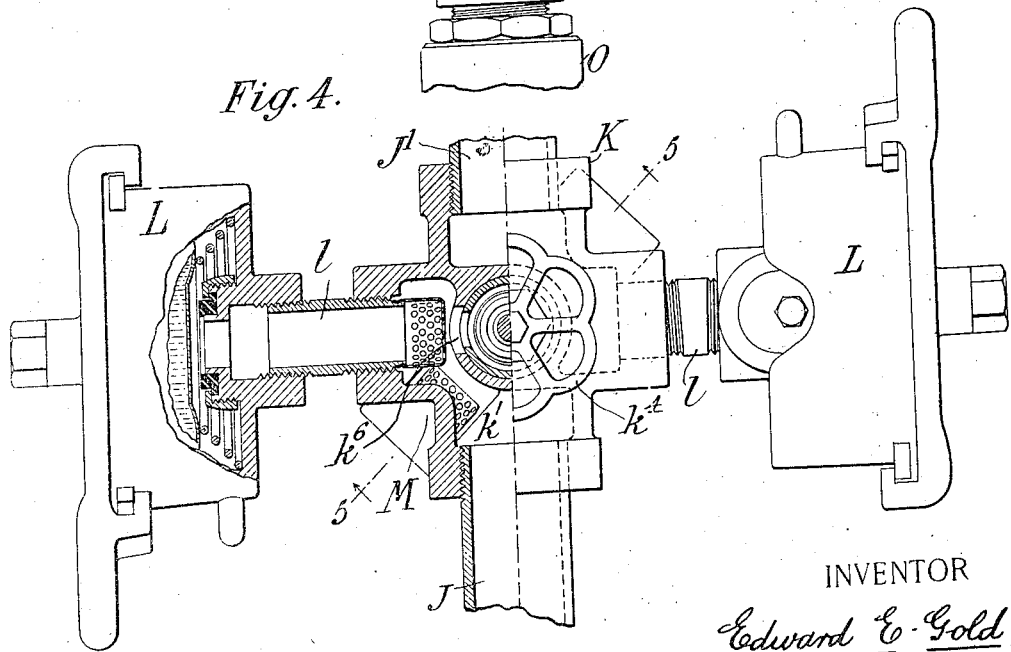

In the said drawings,—Figure 1 is a plan view of a steam heating system according to my invention, partly broken, the parts beneath the floor of the car being shown in dotted lines and the air trunk being removed; Fig. 2 is a cross-section thereof on the line 2—2 in Fig. 1 looking toward the right; Fig. 3 is a view partly in elevation and partly in section of a common valve forming part of said invention; Fig. 4 is a further view of said valve and its connections partly in plan and partly in section; Fig. 5 is a view of the said valve partly in plan and partly in section on the line 5—5 in Fig. 4; Fig. 6 is a plan view partly in section of the parts of the steam heating system below the car floor taken on the line 6—6 in Fig. 2, illustrating the said parts partly in plan and partly in section; Fig. 7 is a plan view of the heating system, the car body being shown in section; Fig. 8 is a vertical longitudinal section through a car on the line 8—8 in Fig. 7; Fig. 9 is a detail vertical section illustrating part of a radiating system and the air supply; Fig. 10 is a horizontal section of the same parts; Figs. 11 and 11$^a$ are detail views illustrating the method of supplying air to the air trunk; Fig. 12 is a detail cross-section of a lateral radiating branch illustrating means of securing a radiating coil thereon; Fig. 13 is a detail illustrating a modified form of the means illustrated in Fig. 12; Fig. 14 is a cross-section of one of the lateral radiating branches. Fig. 15 is a still further modified form of the means illustrated in Fig. 12.

I have illustrated my invention as applied to a steam heating system wherein steam is supplied to the radiating systems located within the various cars from the train-pipe A which extends the length of the train, and is supplied with steam from the locomotive boiler. Branches A' are connected to the said supply pipe and conduct steam therefrom to the supply pipe B which supplies steam to the radiating systems C C' located within the car. Each of the said systems has a hand-controlled valve $c$ by which steam may be shut off from any one of the said systems. As illustrated in Fig. 1, each car contains four of such steam heating systems, each of which may be operated independently of the others, and they are illustrated as being divided, so that two of such radiating systems are located upon each side of the car. Each of such radiating systems is illustrated as double branched, having branches $c^1$ $c^2$ each of which has a lower return pipe $c^3$ $c^4$. The return pipes $c^3$ $c^4$ are each connected to return pipes J J$^1$ which extend beneath the floor of the car and are there connected to a valve K. The said valve is illustrated in Figs. 3, 4 and 5. It is provided with passages $k^1$ $k^2$ (Fig. 4) which extend from the said return pipes J J$^1$ to a screened pipe $l$ leading to traps L. The said traps L are ordinary thermostatically controlled T-traps for disposing of the condensation water, and their construction forms no part of the present invention. Gravity traps M may well be situated in communication with each of the said passages $k^1$ $k^2$.

The valve K is provided with a central bore in which slides the valve proper $k^3$ controlled by a handle $k^4$ or by its usual extension handle $k^5$. Ports $k^6$ $k^7$ connect the passages $k^1$ $k^2$ with said central bore when the valve $k^3$ is raised.

It will be seen from the foregoing that when the steam escapes through the passages $k^1$ $k^2$ of the valve K and through the T-traps L, that the return pipes are entirely disconnected from each other and are independent in their operation. The T-trap contains a thermostatic vessel $l'$ which is partly filled with a volatile fluid and is adapted to expand when steam passes through the return pipe, and seat itself against the seat $l^2$, closing the pipe $l$. When the condensed water collects and cools the thermostat it will contract and withdraw from seat $l^2$ under influence of spring $l^3$ and the pipe $l$ will then be open and permit the escape of the condensed water. The systems will then operate as pressure systems.

The following means enable the system to be operated as a vapor system:—The valve K is provided with an outlet $k^8$ which when the system is operating as a pressure system, is closed by the valve $k^3$. This outlet communicates with a drip pipe or horn N, Fig. 5, which is open to the atmosphere at its lower end, and connected with which is a thermostat O. This as illustrated is composed of a coil $o$ wound about the horn and filled with a liquid which boils at a low temperature. A screen $o^1$ surrounds the said thermostat O to admit atmospheric air and render the same quickly responsive to changes in temperature. The drip pipe N has openings $n$ rendering the thermostat responsive to the temperature within the drip. The upper end of this coil $o$ is connected by tube $o^5$ to a thermostatic chamber $o^2$ having the usual diaphragm $o^3$ which bears upon the head of valve stem $o^4$, and closes the valve P in the steam supply pipe A$^1$. A spring $p$ maintains this valve normally open, and the thermostat O operates to close the valve against the pressure of this spring. It will now be seen that upon the raising of the valve $k^3$ the condensed water and steam from the return pipes will be permitted to escape through ports $k^6$ $k^7$ which are then uncovered by the valve $k^3$, and to pass out through the drip pipe N, and that the temperature of the said escaping water or steam will control the thermostat O and through it the valve P. Therefore when steam is escaping from the said return pipes the valve P will be closed, shutting off the supply of steam to each of the radiators C C¹, and when the water of condensation passes through the drip N at a sufficiently low temperature to permit it, the spring p will cause the retraction of the valve P and an additional supply of steam will be permitted to flow into the radiators C C¹.

The radiating systems C C¹ have no communication with the atmosphere save through the traps L and M when the system is operating as a pressure system, or through said traps and the drip N when the system is operating as a vapor system, and the only connection which the said return pipes have with one another is through the trap K when the valve k³ is raised. Therefore should it be desired to reduce the supply of heat in the car, and for this purpose one of the valves c be closed, steam will not have access to the said closed radiating system.

The radiating pipes c¹, c², c³, c⁴ extend lengthwise of the car as illustrated, and are preferably located adjacent the floor of the car and at one side thereof next to the side of the car. They are contained within an air trunk or casing E, which may be made of any usual material, and which extends preferably lengthwise of the car. The inner edge of the top of the air trunk E is not in contact with the side of the car, but spaces F are provided between the said casing and the side of the car for the escape of the heated air from the air trunk and its passage up the side of the car. Suitable means may be provided if desirable for spacing the inner edge of the top of the air trunk from the side of the car, which may consist of small blocks G inserted at intervals between the top of the casing and the side of the car to hold the casing in place, and these blocks are of such small dimensions and sufficiently remote from each other, that they will not interfere with the free passage of the heated air out of the casing E.

At convenient points throughout the radiating pipes, I attach heating branches H which are adapted to radiate heat at points in the car between the longitudinal radiating pipes to which they are attached. These branches H may well be connected to the return pipe c⁴ and extend laterally therefrom to a point adjacent the aisle of the car. They will preferably be located under the car seats. The said branches are connected to the return pipe rather than to the supply pipe c², because the return pipe is on a lower level and affords room for a slight pitch of the branch H toward the said return pipe, whereby the water of condensation is returned. The connection of the said lateral branch to the steam pipe c² will not permit the pipe to have this pitch and be located under the car seat. Each branch H is surrounded by a shell h which has rows of perforations h¹ extending from end to end of the said shell, and through which the air heated by contact with the steam heated branch H and with the pipes in the air trunk E may escape. I prefer to locate these perforations upon each side of the branch H, and to extend them from end to end as shown, as thereby an even distribution and diffusion of the heated air throughout the body of the car is obtained. The outer end of the shell is preferably open as at h², so that heated air may also escape therefrom. To increase the heating surface of the radiating pipes the same may well have thereon a helical coil h³. Suitable means are provided for retaining the ends of this coil upon the pipe. Hitherto it has been the practice to drill holes in the pipe for retaining the ends of the said wire. This has been difficult, as it is expensive and may cause leaks. I therefore provide an anchor Q which at one point q is slightly raised from the said pipe, permitting the ends of the coil to be passed around the anchor and secured thereto. This anchor may be secured to the pipe as by being welded thereto at q¹, or by being countersunk therein as at q² (Fig. 13). Or it may be slipped loosely therein and crimped in place by having a crimp q³ formed therein after application as in Fig. 15, or these methods or some of them may be joined. A partition h⁴ may be employed within the radiating pipe H to assist in the return of the water of condensation. Air is supplied to the air trunk or casing E from duct R through perforations r. This duct is located usually beneath the car and extends lengthwise thereof, and is in communication with a vertical duct r¹ which extends usually to the top of the car where air is taken in, and where the admission is effected by a hood r². Suitable means may be provided if desired to direct a current of air through the said duct r¹. A pivoted baffle r³ adapted to swing against seats r⁴ r⁵ will answer this purpose. Fig. 11 is a section taken cross-wise of the car, while Fig. 11ª is a section taken lengthwise of the car.

The shells h are illustrated as being open to the air trunk E, and as air is forced by the hood r² through ducts r¹ R, and perforations r, into the casing E under pressure, it will be apparent that a constant supply of fresh heated air will be forced out through the openings F between the casing E and the side of the car, and through the shells h by means of the open end $h^2$ and the perforations $h^1$. Thereby the car is not only ventilated, but also heated. Screens $s$ may if desired be placed upon hood $r^2$ to prevent the passage of cinders therein.

The circulating steam heating system herein described, which has a plurality of radiating systems, a common supply pipe, independent return pipes leading to an outlet, which may be individual or common according to adjustment, and means whereby the same may operate as a vapor system or as a pressure system, is not claimed herein but is claimed in a divisional application, Serial No. 669,271, filed January 3, 1912. Likewise the valve K which is illustrated in connection with said circulating system and to which said independent return pipes are connected, is not claimed herein but is claimed in a divisional application, Serial No. 669,270, filed January 3, 1912. Also the means for fastening or anchoring the coiled wire upon the pipe, some forms of which are illustrated in Figs. 12, 13 and 15, are not claimed herein but are claimed in a divisional application, Serial No. 669,272, filed January 3, 1912.

It is not to be inferred from the particularity with which I have described the details of construction that I regard my invention as necessarily limited thereto, as the precise form, location and construction of the elements described may be changed and equivalent devices substituted within the limits of the appended claims.

I claim as my invention:—

1. In a steam car heating system a radiating pipe attached thereto and extending lengthwise of the car and located adjacent a side of the car and below the seats, an air trunk surrounding same and so constructed as to provide an opening for the escape of heated air between said air trunk and the side of the car, lateral branches leading from said radiating pipe and inclined toward the same, and a shell surrounding each branch and having an air passage to said air trunk, each of said shells being perforated between its ends, and means for supplying said air trunk with atmospheric air whereby heated air is delivered to said car through the perforations in said shell, and a current of said heated air is caused to ascend at the side of the car.

2. In a steam car heating system, a radiating pipe attached thereto and extending lengthwise of the car and located adjacent a side of the car and near the floor, an air trunk surrounding same and spaced from the side of the car to provide an opening for the escape of heated air between said air trunk and the side of the car, a duct extending lengthwise of the car for delivering atmospheric air to said air trunk at intervals, means for supplying atmospheric air to said duct from above the level of the car floor, lateral branches from said radiating pipe and inclined toward the same, and a shell surrounding each branch and opening into said air trunk, each of said shells having an open inner end and side perforations, whereby a current of heated atmospheric air is delivered to said car through the openings in said shell, and a current of said heated air is caused to ascend at the side of said car.

3. In a steam heating system, a radiating pipe located adjacent a side of a car, an air trunk surrounding same having an opening for the escape of heated air between the air trunk and the side of the car, means for supplying atmospheric air to said air trunk, branches connected to the said radiating pipe and inclined toward the same, a shell surrounding each branch having an opening for the escape of heated air, and said trunk having an air passage leading to said shell, whereby a current of atmospheric air heated in said trunk and said shell is supplied to said car.

In witness whereof, I have hereunto signed my name in the presence of two subscribing witnesses.

EDWARD E. GOLD.

Witnesses:
HENRY M. TURK,
THOMAS F. WALLACE.